United States Patent [19]
Diehl et al.

[11] Patent Number: 5,373,557
[45] Date of Patent: Dec. 13, 1994

[54] SYSTEM FOR PROCESSING USER ACCESS CONTROL DATA AT A DECODER

[75] Inventors: Eric Diehl, Strasbourg; Joel Hamon, Lipsheim, both of France

[73] Assignee: Thomson Consumer Electronics S.A., Courbevoie, France

[21] Appl. No.: 116,294

[22] Filed: Sep. 3, 1993

[30] Foreign Application Priority Data

Sep. 14, 1992 [EP] European Pat. Off. ............ 92402504

[51] Int. Cl.⁵ .............................................. H04K 1/00
[52] U.S. Cl. .......................................... 380/20; 380/10
[58] Field of Search ................ 380/10, 20; 358/349; 455/6.1

[56] References Cited

U.S. PATENT DOCUMENTS

| | | | |
|---|---|---|---|
| 4,471,379 | 9/1984 | Stephens . | |
| 4,475,123 | 10/1984 | Dumbauld et al. | 380/20 X |
| 4,503,462 | 3/1985 | Kelly et al. . | |
| 4,558,464 | 12/1985 | O'Brien et al. | 380/20 |
| 5,046,093 | 9/1991 | Wachob | 380/20 |
| 5,058,160 | 10/1991 | Banker et al. | 380/20 |
| 5,231,664 | 7/1993 | Bestler et al. | 380/20 |

OTHER PUBLICATIONS

Patent Abstracts of Japan–JP5808936 Published Aug. 16, 1983.

*Primary Examiner*—Tod R. Swann
*Attorney, Agent, or Firm*—Joseph S. Tripoli; Eric P. Herrmann; Ronald H. Kurdyla

[57] ABSTRACT

A subscriber/user TV system operates in response to locally stored entitlements. A user gains access to a program only if the description of the program is consistent with entitled rights owned by the user. Each night at a given hour, decoders affiliated with the system tune to a predetermined video or audio channel, a so-called Barker channel. Decoders previously in a stand-by mode are activated in order to tune to the Barker channel. The program provider then sends the entitlement data on the Barker channel while every affiliated decoder is responsive to an incoming data stream.

12 Claims, 1 Drawing Sheet

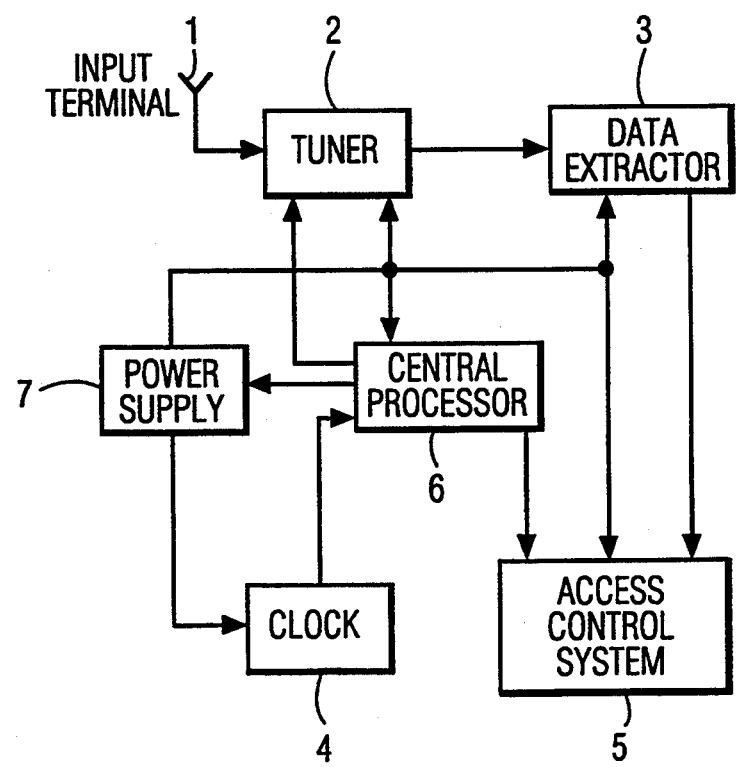

SYSTEM FOR PROCESSING USER ACCESS CONTROL DATA AT A DECODER

FIELD OF THE INVENTION

This invention concerns a system for selectively receiving and processing user access control data such as in a subscriber television system, for example.

BACKGROUND OF THE INVENTION

Subscriber (pay) TV systems often operate on the basis of entitlements stored in the form of data either in a decoder at a receiver, or in a detachable control access system such as a so-called "smart card". The subscriber/user gains access to a given program only if the description of the current broadcast program is consistent with the entitled rights owned by the user. The entitlements are updated "over-the-air", whereby data, often in encrypted form, are sent together with scrambled program information such as scrambled video. Data analysis by the access control system updates the current entitlements status of the user. However, if the user is not tuned to the channel carrying such "over-the-air" data while data dedicated to the user are being transmitted, such data are lost, and the program provider usually has no knowledge of the loss. The program provider therefore does not know the current entitlement status of the users.

Two currently used solutions to this addressing problem are as follows. The first solution involves sending the entitlement data more than once. This method is efficient and, from the standpoint of material cost, implies no price impairment. However, the bandwidth necessary to transmit the entitlement rights is drastically increased, or, for the same bandwidth, the time needed to update a complete population is significant. Furthermore, there is no way to know if the data were received. A second method uses a "back link". In this case the decoder may be equipped with a modem or with a modulator in a cable network environment. The decoder can "phone" the subscriber management center to confirm reception of the entitlement rights. However, this approach is expensive since the cost of the decoder is increased and the subscriber management center has to be equipped with an expensive automatic phone center.

SUMMARY OF THE INVENTION

To overcome the problems and disadvantages noted above, a system according to the invention operates as follows. Each night, at a given hour (a so-called "wake up" hour) every decoder in the system tunes to a predefined video or audio channel, a so-called "Barker channel". Decoders which were previously in a stand-by mode are activated in order to tune to the Barker channel. In order not to disturb a sleeping user, at the "wake-up" hour an activated decoder does not activate signals to the external world, such as via Pin 8 of a SCART plug. The program provider can then send the maximum of entitlements on the Barker channel, knowing that every activated decoder will be "listening to" its data stream.

The decoder extracts the data from the Barker channel, and transfers the data to the access control system. If one of the enhanced transmission modes described previously is used, the access control system will act accordingly. At a given hour, a "sleep hour", the decoders are inactivated with respect to data reception and return to a stand-by mode.

In accordance with the inventive system, a decoder evaluates access control related data, especially entitlement data, which are transmitted within a broadcast signal. A processor in the decoder monitors the time of day, and all such decoders suited for receiving such broadcast signal are enabled to receive the access control data during a control interval between a predetermined wake-up time and a predetermined sleep time, using means for demodulating/extracting and processing the access control data. These means are active after the wake-up time, and inactive in a stand-by mode after the sleep time under the control of the processor. During the control interval, the means for access control are entitled or further entitled to have access to the broadcast signal or further broadcast signals.

The disclosed decoder includes a power supply and real-time clock coupled to the processor. The processor detects the time interval between a predetermined wake-up time and a predetermined sleep time (i.e., the control interval). During this interval the processor activates, via the power supply, a circuit for demodulating a TV or audio signal broadcast in a Barker channel, means for extracting therefrom access control-related data, and means for allowing access control to television and/or audio channels. The processor deactivates these means after the control interval, via the power supply, such as by placing such means in a standby mode. Thus the control means is entitled or further entitled to have access to predetermined TV and/or audio signals.

BRIEF DESCRIPTION OF THE DRAWING

The sole FIGURE is a block diagram of a portion of a decoder system according to the principles of the present invention.

DETAILED DESCRIPTION

During a stand-by mode, a power supply 7 maintains power only for a central processor 6 and a clock 4. Clock 4 can be either a dedicated external component such as a real time clock, or a software function of the software operative in processor 6. Central processor 6 waits until the time indicated by clock 4 is equal to or greater than the wake up hour. At such time power supply 7 is switched into a mode wherein tuner 2, data extractor 3 and access control system 5 are activated. Central processor 6 then transmits the frequency of the Barker channel to tuner 2. The video signal received from input terminal 1 is demodulated by tuner 2 and passed to data extractor 3. The extracted data are passed to access control system 5. Control system 5 can either a separate process in a different processor, or resident in central processor 6. If data other than entitlement rights are transmitted, they will be shared between access control system 5 and central processor 6. When the time indicated by clock 4 is greater than or equal to the sleep hour, power supply 7 is switched (via processor 6) to a stand-by mode, deactivating tuner 2, data extractor 3 and access control system 5 and placing these elements in a stand-by operating mode.

The Barker channel data may be used in a more efficient way than during a normal descrambling session. Following are several suggested methods. The full bandwidth may be used for the data, replacing video and/or audio information with user entitlement information. The system may transmit only data related to entitlements, and suppress data related to the scrambling process. The system may use a more efficient data protocol knowing that the access control process will work only with entitlements.

Permanent wake-up and sleep hours need not be stored in the decoder. At the beginning of each data updating control interval, it is possible to transfer data defining the wake-up and sleep hours for the next session. Barker channel defining data can be similarly conveyed.

For proper operation, a time shift (offset) between the actual time and the decoder's internal clock time should not be too large. To assure this, the current time may be sent over the air in order to update the decoder's internal clock, e.g., once per day. A device described in EP-A-92400812 for sending an over-the-air adjusted real time clock can be used for this purpose.

Data sent during a night period, i.e., during the control interval between the wake-up and sleep times, are not necessarily dedicated only to entitlement updates. The same night period can also be used for down-loading data to update items such as algorithms, encryption keys and/or frequency allocation tables in the decoder. The program provider thus insures that all installed decoders are updated.

The invention can be used with various pay TV or pay audio systems, e.g., EUROCRYPT or VIDEOCRYPT.

What is claimed is:

1. In a subscriber data utilization system including a decoder for processing subscriber data and access control data contained within a transmitted signal received by said decoder, said decoder being operative to process said subscriber data in a normal mode and exhibiting a standby mode at other times when normal processing of subscriber data is inhibited, decoder apparatus comprising:

clock means for generating a time representative signal;
   processor means responsive to said time representative signal for conditioning components of said decoder to receive and process a transmitted signal including said access control data during a predetermined control interval between first and second times, and to operate in said standby mode at the end of said control interval;
   input means responsive to said transmitted signal and to output signals from said processor means; and
   access control means coupled to said processor means and to said input means for processing received access control data during said control interval; wherein
   said predetermined control interval is subject to occurring during said standby mode and exhibits a duration less than that of said standby mode; and
   during said control interval said processor means activates said input means to receive said access control data and activates said access control means to process said access control data, and at the end of said control interval said input means and said access control means return to said standby mode.

2. A system according to claim 1, wherein
   said access control data is transmitted within a dedicated Barker channel; and
   said input means contains tuner means tuned to said Barker channel during said control interval in response to an output control signal from said processor means.

3. A system according to claim 2, wherein
   said first and second times associated with said control interval are transmitted within said Barker channel and are evaluated by said processor means.

4. A system according to claim 2, wherein
   during said control interval said Barker channel contains information representative of a channel to be tuned to during a subsequent control interval.

5. A system according to claim 2, wherein
   during said control interval said Barker channel contains information representing current time for use by said processor means to establish current time for said decoder.

6. A system according to claim 1, wherein
   said access control data comprises entitlement data.

7. A system according to claim 1, wherein
   said transmitted signal is a television signal.

8. A system according to claim 1, wherein
   said transmitted signal is an audio signal.

9. A system according to claim 1, wherein
   said transmitted signal contains, during said control interval, auxiliary data for updating operating parameters of said decoder.

10. A system according to claim 2, wherein
    access control data replaces audio-video information in said Barker channel during said control interval.

11. A system according to claim 1, wherein
    said input means includes tuner means for providing a demodulated signal transmitted in a Barker channel, and means for extracting access control data from a demodulated output signal of said tuner means;
    access control means responsive to an output signal from said extracting means for allowing access to information-containing channels; and
    power supply means providing decoder operating power and responsive to an output signal from said processor means, said power supply means being (a) activated during said control interval for providing normal operating power for decoder components including said processor means, said tuner means and said extracting means, and (b) providing stand-by power for said decoder components after said control interval.

12. A system according to claim 1, wherein:
    said input means includes channel tuner means operative during said normal mode and operative during said predetermined control interval, and inoperative during said standby mode exclusive of said predetermined control interval.

* * * * *